3,051,659
METHOD OF PRODUCING A STABLE COAGEL OF
AN ALKALINE EARTH FLUORIDE
Sjerp Anne Troelstra, Emmasingel, Eindhoven, Netherlands, assignor to North American Philips Company, Inc., New York, N.Y., a corporation of Delaware
No Drawing. Filed Feb. 15, 1961, Ser. No. 89,355
2 Claims. (Cl. 252—317)

The invention relates to the production of a gel. Gels may be distinguished mainly in two types in accordance with their structure.

This application is a continuation-in-part of the U.S. application Serial No. 626,818, filed December 7, 1956, now abandoned.

With one type macromolecules or polymerized unities form a network and the forces at the junctions of this network determine the properties. Examples of such systems are gelatine gel, agar-agar-gel, silicic acid gel and gels of hydrated oxides, of metals, for example aluminium, cerium and thorium.

The invention relates to systems of the second type. It has sometimes been possible to produce these systems by dividing colloidally the substance in a polar dispersion agent either by mechanical means (grinding) or by chemical agency (precipitation) and by adding subsequently an electrolyte to obtain carefully coagulation until the particles have joined to form a loose accumulation.

A substance can, of course, be divided colloidally in a dispersion agent only when it dissolves therein to a small extent. However, ions from the surfaces of the particles are dissolved in the dispersion agent, so that depending upon whether positive or negative ions are given off, the particles obtain a negative or a positive surface charge respectively.

To such a system may be added an electrolyte containing so-called potential-determining ions, i.e. positive or negative ions of the dispersed substance or ions capable of replacing the first-mentioned ions at the surfaces of the particles or in the lattice of the substance particles. With a given concentration of the potential determining ions a zero charge (zero point of charge) may be obtained and hence by means of particular concentrations positive or negative surface charges may be provided and enhanced. An enhanced surface charge has the effect that the relative approximation of the particles is more hindered and that the system becomes more stable.

The addition of other electrolytes does not change the charge condition of the particles and brings about only by the variation of the electrolyte concentration a decrease in the relative repulse of the particles. By further addition of such an electrolyte the particles may approach one another more and more, until at a given concentration the attarctive forces between the particles predominate and the substance coagulates.

Coagulation may sometimes be obtained also by adding a less polar dispersion agent. If for example to a dispersion in water are added substances such as acetone or alcohol, the ionization at the surfaces of the particles is varied and thus the stability of the system may be reduced.

In certain cases a coagulum of particular structure is obtained, which is termed coagel. Coagels distinguish from other coagula in that they form a network of coherent particles which is capable of absorbing strongly varying quantities of the dispersion agent.

Such coagels may be obtained from substances such as bentonite, graphite and vanadium pentoxide, which are very suitable to form such a network owing to the sheet- or rod-like shape of the particles.

In the case of isodiametrical particles such a network may be considered to be produced by joining the dispersed particles in the form of a chain and joining these chain agglomerations.

Many of such dispersed systems exhibit the difficulty that no gel is produced at any concentration of the coagulant. Evidently in these cases the interaction between the particles owing to electrical and attarctive forces is too small in order to obtain a gel of adequate rigidity. (A measure for the rigidity is the force to be exerted before deformation of the loose accumulation of the particles occurs.) A further disadvantage which may occur in the formation of gels is that the gel can exist only in a restricted range of concentrations of the coagulant.

From experiments leading to the invention it has been found that these difficulties of gel formation may, in some cases, i.e. with alkaline earth fluorides ($MgF_2$, $CaF_2$, $SrF_2$ and $BaF_2$) be obviated by providing an increased surface charge on the dispersed particles.

As stated above, an increased charge of the dispersed particles may be obtained by adding an electrolyte to the dispersion, this electrolyte containing so-called potential-determining ions.

The invention relates to a method of producing coagels of alkaline earth fluorides from a dispersion thereof in a polar liquid and is characterized in that to the dispersion there is added a solution containing potential-determining ions, so that the surface charge of the dispersed particles is increased and the dispersion is coagulated in this state until a gel is formed.

In accordance with the invention the dispersed particles may be given a charge of the same polarity as that of the charge of these particles in the dispersion agent chosen. As an alternative, the procedure may be such that the zero point of charge is overtaken and the polarity of the particle charge is reversed.

After the charge on the surface of the dispersed particles has been increased the formation of a gel can be obtained with the aid of any coagulant, as long as this does not produce additional phenomena susceptible of counteracting or neutralizing the purpose aimed at. Such complications do not occur, if the coagulant is the same electrolyte as that producing the charge. Moreover, the charging lasts, in this case, in general, until the gel is formed and thus a maximum charge may be attained under the given conditions.

The invention distinguishes sharply from what is known in that a potential-determining electrolyte is added in order to increase the surface charge of the particles and, if desired, to coagulate. With known methods the coagulation is obtained by adding an electrolyte which does not produce a charge of the particles, since the increase in charge would render the system more stable, while with coagulation just the reverse is aimed at.

Compared to the methods in which the dispersed particles are not previously charged, the use of the invention provides the following advantages:

(1) The concentration of the coagulant used for the formation of the gel is less critical.

(2) The concentration of the dispersed phase may be varied within wider limits. It is possible for example to obtain gels with a content of 2 to 50 vol. percent in the dispersed phase, calculated on the total quantity of gel.

(3) The rigidity of the gels is greater.

If, in view of their use, the gels are too concentrated, they may be diluted by adding a solution of the same electrolyte as that producing the gel, the strength of the electrolyte being such that the concentration in the liquid contained in the gel remains approximately the same as that prevailing at the moment of the formation of the gel. Since the production of the gel in accordance with the invention is completely reversible, the dilution need not be carried out with such care that the gel state is constantly maintained. By providing a value of the electrolyte concentration which determines the state of gel, the gel may always be restored.

The gels according to the invention may be used as plastic binders and pressing agents, for example in the ceramic industry, as inorganic lubricants, as sealing agents and in printing paints.

The invention will be explained hereinafter with reference to a few examples.

(1) To 500 gs. of fluorspar ($CaF_2$) ground for twice 24 hours in a ball mill in the dry state is added 110 mls. of a substantially saturated $CaCl_2$ solution containing 650 gs. of anhydrous $CaCl_2$ per litre of water and the mixture is mixed intensively. A pastelike, dilatant mass, which runs out is formed. If a larger quantity of the same $CaCl_2$ solution up to about 250 mls. is added, an intensive mixing in a mixer for two hours yields a turbid, jelly-like mass.

If the same quantity of fluorspar is ground in the same manner with 250 mls. of water, only a sandy paste is formed.

(2) 1500 gs. of a different fluorspar is ground in the dry state for 24 hours in a ball mill, then introduced into a mixer and rubbed for one hour with a solution of 200 gs. of anhydrous $CaCl_2$ in 600 mls. of water. A yellowish mass having the appearance of a turbid lubricating fat is obtained. By adding a larger quantity of $CaCl_2$ solution a thinner jelly may be obtained, which does not run out.

1500 gs. of the same fluorspar, mixed in the same manner with 700 mls. of water, yields a rather thin, dilatant mass.

(3) Precipitated $CaF_2$ is produced by adding, while stirring, to 200 gs. of ground chalk, suspended in 200 mls. of water, small quantities of hydrofluoric acid (48%) until the reaction remains just acidic (pH is about 4), after which the precipitate is sucked off.

100 gs. of this moist $CaF_2$ is mixed, while being rubbed intensely with 60 to 100 mls. of a substantially saturated $CaCl_2$ solution containing 650 gs. of anhydrous $CaCl_2$ per 1000 mls. of water. In accordance with the quantity of $CaCl_2$ a more or less thick gel is obtained, the consistency having the character of Vaseline. In thin layers the mass is quite transparent and by electron-microscopic examination it is found that it contains almost exclusively very fine particles of 300 to 500 A. in diameter.

If 100 gs. of the same precipitated $CaF_2$ is mixed by stirring with 60 mls. of water, a white paste is obtained, which may be changed into a thin slush.

If this $CaF_2$ suspension is rubbed with solid KCl up to saturation point, no gel is formed. A gel is, however, formed if the $CaF_2$ particles are first charged, as stated above, with the aid of a $CaCl_2$ solution and then coagulated with the aid of KCl. The gel obtained however, has not the same fair plasticity as that of the gel obtained by coagulation with the aid of $CaCl_2$.

(4) If 500 gs. of precipitated $MgF_2$, obtained in a manner similar to that described for $CaF_2$ in Example 3, is mixed intimately with 300 mls. of water, a flabby leaven like mass is obtained. If, on the contrary, the same quantity of precipitated $MgF_2$ is stirred in the same manner with 300 mls. of a substantially saturated solution of $MgCl_2$, containing about 500 gs. of $MgCl_2$ 6 aq. per litre of water, a slithery jelly is formed. This jelly is less clear than the gel obtained from $CaF_2$ and $CaCl_2$.

If the $MgF_2$ is treated with an approximately saturated $Mg(NO_3)_2$ solution a transparent gel is also readily obtained.

(5) To 100 gs. of the precipitated $CaF_2$, obtained as described in Example 3, is added 52 mls. of a solution of $ZnCl_2$ containing 180 gs. of anhydrous $ZnCl_2$ per 100 mls. of water, and the mixture is kneaded thoroughly. A clear, quite transparent gel is formed.

(6) 100 gs. of $SrF_2$, ground in the dry state for 20 hours in a ball mill, yields, after the addition of 65 mls. of water and after subsequent grinding for one hour, a thick, sandy, toughly running mass. If the same quantity of $SrF_2$ is ground in the same manner together with 65 mls. of a solution containing per 100 gs. of water 50 gs. of anhydrous $SrCl_2$, a slithery non-transparent mass is formed, which does not run out. By treating the same quantity of $SrF_2$ with 65 mls. of a $CaCl_2$ solution containing 67 gs. of anhydrous $CaCl_2$ per 100 mls. of water, a more transparent gel of ointment-like consistency is obtained.

(7) To 500 gs. of ground fluorspar is added 250 mls. of $CdCl_2$ solution containing 100 gs. of anhydrous $CdCl_2$ per 100 gs. of water. Then the mixture is ground in a mixer for 2 hours. A turbid, jelly-like mass is then obtained.

(8) Starting from 500 gs. of precipitated $CaF_2$, produced as described in Example 3, intimate mixing with 300 to 500 mls. of the same $CdCl_2$ solution as described in Example 7 yields a completely transparent gel.

(9) 100 gs. of fluorspar, ground in the dry state, mixed and kneaded with 48 mls. of a $Mg(NO_3)_2$ solution containing 60 gs. of anhydrous $Mg(NO_3)_2$ per 100 gs. of water, yields a white, non-transparent gel.

(10) A precipitated $BaF_2$ is produced in a manner similar to that described for the $CaF_2$ in Example 3, from barium carbonate and hydrofluoric acid (48%). If 80 gs. of this preparation is mixed intimately and rubbed with 40 to 50 mls. of a substantially saturated aqueous barium chloride solution containing about 35 gs. of $BaCl_2$ per 100 gs. of water, a mass is obtained which hardly has the nature of a gel. The comparatively high solubility product of $BaF_2$, the position of the zero point of charge of this substance and the moderate solubility of the $BaCl_2$ are unfavourable factors for the purpose aimed at.

A much better result is obtained by rubbing 80 gs. of the said $BaF_2$ preparation with 40 mls. of a substantially saturated $CaCl_2$ solution, containing about 75 gs. of $CaCl_2$ per 100 gs. of water. It may be assumed that in this case by superficial conversion the $BaF_2$ particles are coated with a layer of $CaF_2$, so that the particles are jellified in the manner described above by the $CaCl_2$ solution.

If 80 gs. of the $BaF_2$ preparation is rubbed with 30 to 40 mls. of a substantially saturated solution of cadmium chloride, containing about 110 gs. of $CdCl_2$ per 100 gs. of water, a gel is obtained, which is transparent in thin layers.

(11) Calciumfluoride is precipitated in the way described in Example 3 and filtered off with suction.

100 gs. of this moist $CaF_2$ is mixed on rubbing intensively with 60 mls. each of following solutions:

(a) 88.7 gs. $Cu(NO_3)_2.6H_2O$ in 100 mls. water
(b) 87.2 gs. $Ni(NO_3)_2.6H_2O$ in 100 mls. water
(c) 71.3 gs. $NiCl_2.6H_2O$ in 100 mls. water
(d) 86.1 gs. $Mn(NO_3)_2.6H_2O$ in 100 mls. water
(e) 71.3 gs. $CoCl_2.6H_2O$ in 100 mls. water
(f) 89.1 gs. $FeCl_3.6H_2O$ in 100 mls. water
(g) 34.5 gs. $NH_4HSO_4$ in 100 mls. water
(h) 56.5 gs. $Pb(NO_3)_2$ in 100 mls. water (saturated)
(i) 100 gs. $CeCl_3$ in 100 mls. water (saturated)
(k) 150 gs. $Cs_2SO_4$ in 100 mls. water
(l) 200 gs. $UO_2(NO_3)_2.6H_2O$ in 100 mls. water
(m) 18.1 gs. $LiCl.H_2O$ in 100 mls. water
(n) 144 gs. $Th(NO_3)_4$ in 100 mls. water Clear transparent gels are obtained of which (a) possesses a beautiful blue color, (b) and (c) green colors, (d) and (e) pink colors, (f) a yellowish brown color with an appearance of wheel-grease and (l) a yellowish green color.

What is claimed is:

1. A method of producing a stable coagel consisting essentially of an alkaline earth fluoride comprising the steps, forming a dispersion of an alkaline earth fluoride in water, increasing the surface charge on the dispersed particles of said alkaline earth fluoride by adding to said dispersion a solution in water of a potential determining ion selected from the group consisting of $Ca^{++}$, $Mg^{++}$, $Zn^{++}$, $Sr^{++}$, $Cd^{++}$, $Cu^{++}$, $Ni^{++}$, $Mn^{++}$, $Co^{++}$, $Fe^{+++}$, $NH_4^+$, $Pb^{++}$, $Ce^{+++}$, $Cs^+$, $UO_2^{++}$, $Li^+$ and $Th^{4+}$ and then adding to said dispersion, in an amount sufficient to coagulate said dispersion, a coagulating solution consisting of a solution of an electrolyte in water, the amount of water in said coagulating solution being sufficient to produce a gel containing from 50% to 98% by volume of water.

2. A method of producing a stable coagel consisting essentially of an alkaline earth fluoride comprising the steps, forming a dispersion of an alkaline earth fluoride in water, increasing the surface charge on the dispersed particles of said alkaline earth fluoride by adding to said dispersion a solution in water of a potential determining ion selected from the group consisting of $Ca^{++}$, $Mg^{++}$, $Zn^{++}$, $Sr^{++}$, $Cd^{++}$, $Cu^{++}$, $Ni^{++}$, $Mn^{++}$, $Co^{++}$, $Fe^{+++}$, $NH_4^+$, $PB^{++}$, $Ce^{+++}$, $Cs^+$, $UO_2^{++}$, $Li^+$ and $Th^{4+}$ and then adding to said dispersion, in an amount sufficient to coagulate said dispersion, a coagulating solution consisting of an additional amount of the solution in water of said potential determining ion, the amount of water in said coagulating solution being sufficient to produce a gel containing from 50% to 98% by volume of water.

No references cited.